J. M. & E. R. CONNOR.
LIFE SAVING DEVICE.
APPLICATION FILED NOV. 14, 1911.
1,057,221.
Patented Mar. 25, 1913.
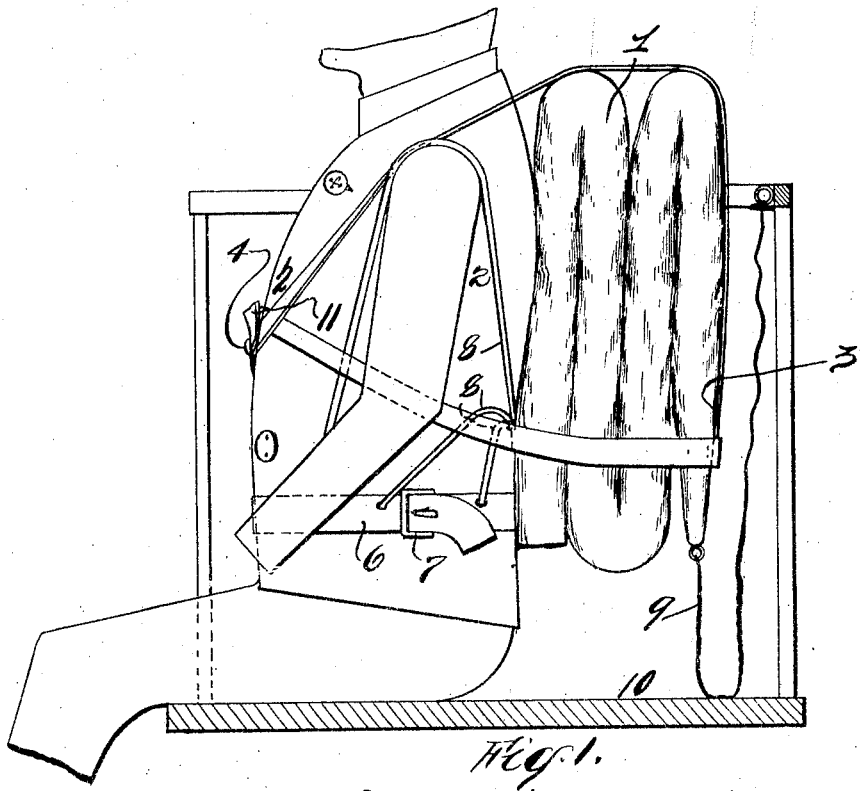
Fig. 1.
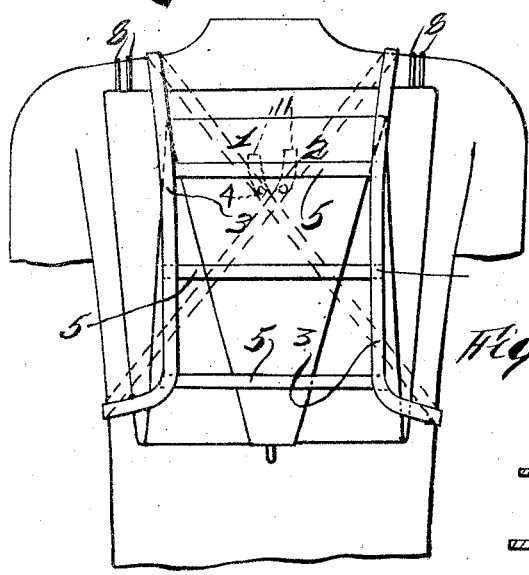
Fig. 2.
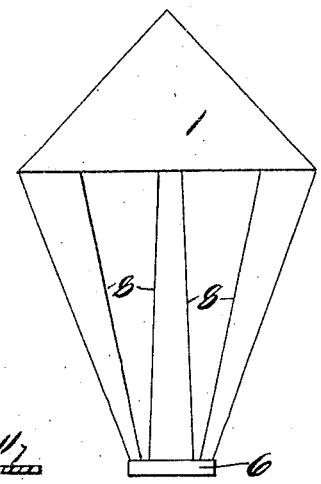
Fig. 3.
Fig. 4.
Witnesses:
Inventors:
Joseph M. Connor
Elmer R. Connor
by Edward A. Jarvis
Attorney.

UNITED STATES PATENT OFFICE.

JOSEPH M. CONNOR, OF NEW YORK, AND ELMER R. CONNOR, OF PORT RICHMOND, NEW YORK.

LIFE-SAVING DEVICE.

1,057,221.   Specification of Letters Patent.   Patented Mar. 25, 1913.

Application filed November 14, 1911. Serial No. 660,247.

*To all whom it may concern:*

Be it known that we, JOSEPH M. CONNOR, a citizen of the United States of America, residing at New York city, Manhattan borough, and State of New York, and ELMER R. CONNOR, a citizen of the United States of America, residing at Port Richmond, Richmond county, Staten Island, New York, have invented certain new and useful Improvements in Life-Saving Devices, of which the following is a full, clear, and exact description.

This invention relates to an improvement in life saving devices, but more particularly to parachutes.

The object of our invention is to provide a parachute and means adapted to releasably secure the same to the body, whereby aviators, for instance, are provided with means adapted to check their fall should the aeroplane become disabled and fall.

Our improved safety device may also be used to facilitate the escape of occupants of burning buildings.

We will now proceed to describe our invention in detail, the novel features of which we will point out in the claims, reference being had to the accompanying drawing, forming part hereof, wherein:

Figure 1 is a diagrammatic side view illustrating the manner of securing the parachute to the body; Fig. 2 is a rear view, showing the harness which secures the parachute to the body; Fig. 3 is a diagrammatic side view of the parachute when open; and Fig. 4 is a sectional view illustrating one form of releasable catch for the harness.

Referring to the drawing, our improved life saving device comprises the parachute 1, which is secured, when folded, to the body by a harness 2, comprising the band members 3, which pass around the body and which are secured together by releasable catches 4, at the free ends thereof. The catches 4 may be of any construction which can be quickly separated, such for instance, as are illustrated in Fig. 4. The other members of the harness 2 consist of the connecting strips 5, which hold the band members 3 together.

A further element of the safety device comprises a belt 6 which is independent of the harness and, which is secured to the body by means of a buckle 7. The belt 6 and lower end of the parachute are connected by cords 8.

To facilitate the opening of the parachute, or to automatically position the same over the body, I preferably provide a cord 9, one end of which is secured to the peak or apex of the parachute, the other end being secured to any adjacent member of the aeroplane, such as the seat, for instance, a seat being herein illustrated by 10.

Before securing the parachute to the body, it is folded, as shown in Fig. 1. It is then placed upon the back and secured thereto by the harness above described, the belt 6 being also secured to the body. The cords 8, which connect the front of the belt 6 to the parachute are let over the shoulders. The remaining cords 8 may be disposed where convenient. After the aviator has taken his seat the cord 9 can be secured to the peak of the parachute and seat or other support.

Should the aeroplane fall, the aviator would pull the strap ends 11, which would disconnect the band members 3, at which time the folded parachute would fall from the back. Should the aviator be thrown from his seat and fall, the cord 9 would break as soon as a strain has been placed thereupon. The cord 9 will be strong enough to hold until the parachute has been pulled above the falling aviator. The weight of the falling body will break the cord 9. As soon as the cord 9 has broken, the parachute will open, due to the rapid descent, in a manner common to all parachutes, whereby the fall of the aviator will be checked.

Having now described our invention, what we claim and desire to secure by Letters Patent is:—

In combination with an aeroplane, a life saving device comprising a parachute, a harness adapted to secure the parachute while folded directly to the body, an independent belt adapted for securement to the body, cords connecting said belt and said parachute, and a cord directly connecting the peak of said parachute and the aeroplane, said cord being adapted to first position said parachute over the body, should said body fall, and to break, after the weight of the body is placed thereupon and after said parachute has been positioned over the body.

Signed at New York city, N. Y., this 27th day of October, 1911.

JOSEPH M. CONNOR.
ELMER R. CONNOR.

Witnesses:
SAMUEL D. SEWELL,
HARRY SEWELL.